United States Patent [19]

Stanley

[11] Patent Number: 5,438,503
[45] Date of Patent: Aug. 1, 1995

[54] SLEW RATE CONTROL IN A MULTI-LEVEL SWITCH

[75] Inventor: Gerald R. Stanley, Osceola, Ind.

[73] Assignee: Crown International, Inc., Elkhart, Ind.

[21] Appl. No.: 232,772

[22] Filed: Apr. 25, 1994

Related U.S. Application Data

[63] Continuation of Ser. No. 923,505, Aug. 3, 1992, abandoned.

[51] Int. Cl.⁶ ............................................. H02M 7/537
[52] U.S. Cl. ................................ 363/43; 307/48; 307/63
[58] Field of Search ..................... 363/40, 43, 95, 97; 307/43, 48, 47, 63; 323/268, 271; H02M 7/537

[56] References Cited

U.S. PATENT DOCUMENTS

| | | | |
|---|---|---|---|
| 3,867,643 | 2/1975 | Baker et al. | 307/151 |
| 4,978,866 | 12/1990 | Kuhn | 307/228 |
| 5,013,940 | 5/1991 | Ansel | 307/473 |
| 5,045,990 | 9/1991 | Stanley | 363/43 |

Primary Examiner—Steven L. Stephan
Assistant Examiner—Adolf Berhane
Attorney, Agent, or Firm—Baker & Daniels

[57] ABSTRACT

This invention employs timing circuitry for each voltage source in a multilevel power supply for an amplifier to control the change in voltage outputted from the associated voltage source over time or slew rate when that voltage source is switched on or off preventing large instantaneous voltage increases at the input of the amplifier from occurring when a combination of the voltage sources supplying the amplifier is switched to a different combination upon the output voltage of the amplifier changing.

11 Claims, 6 Drawing Sheets

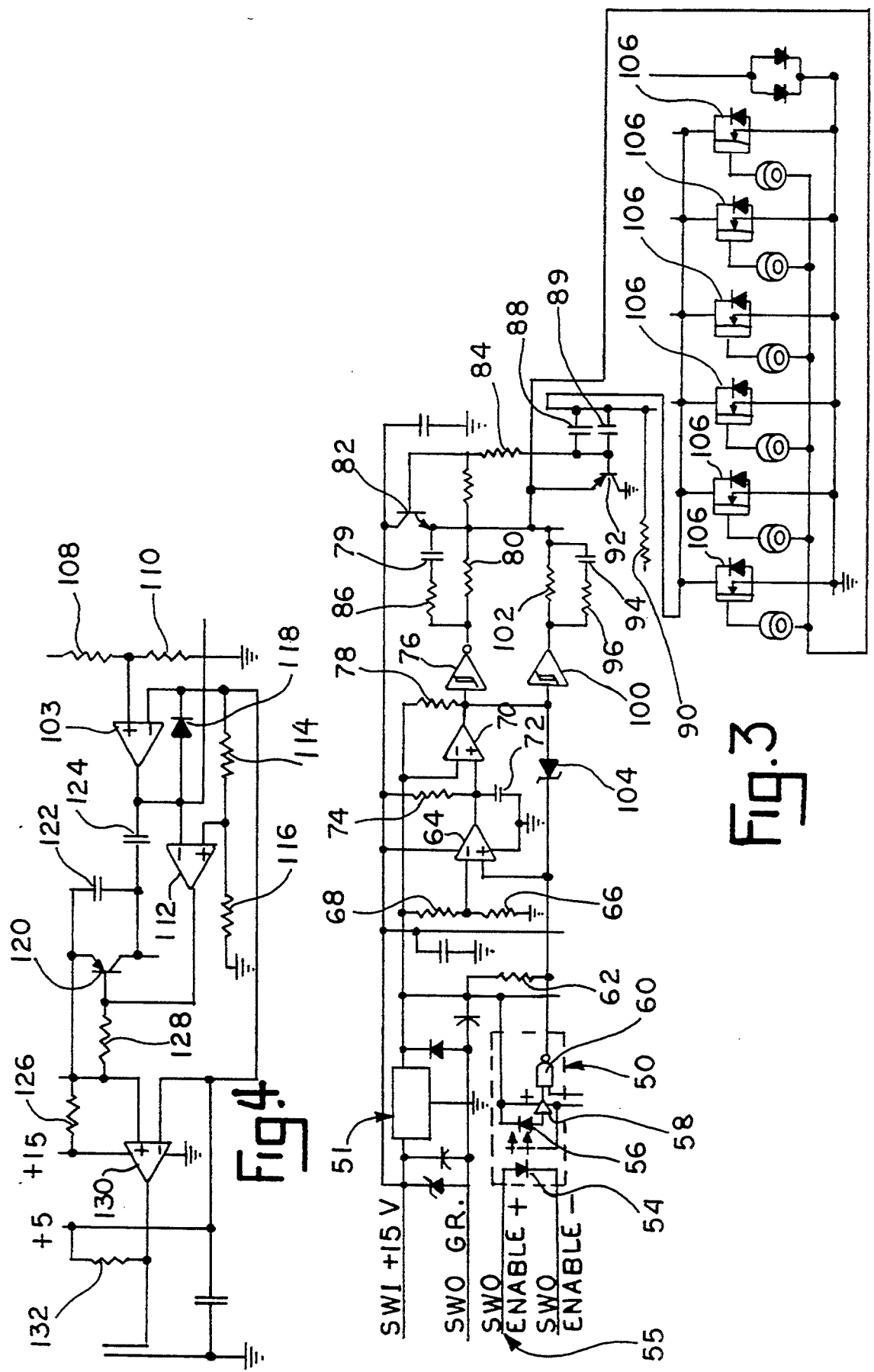

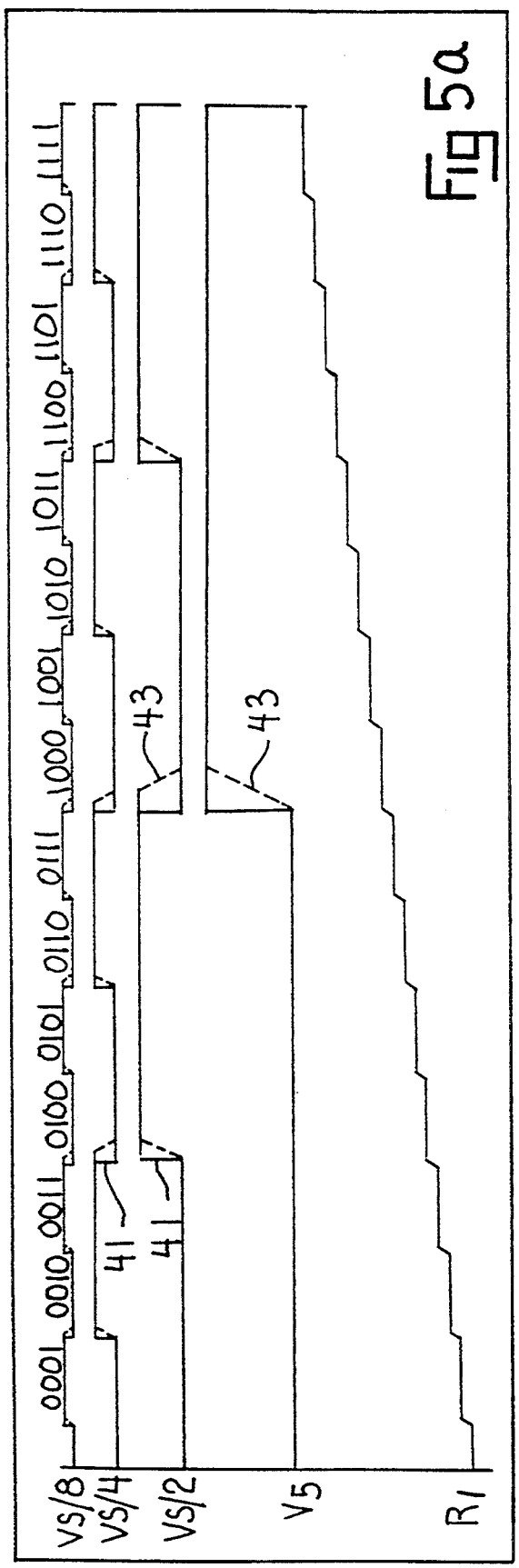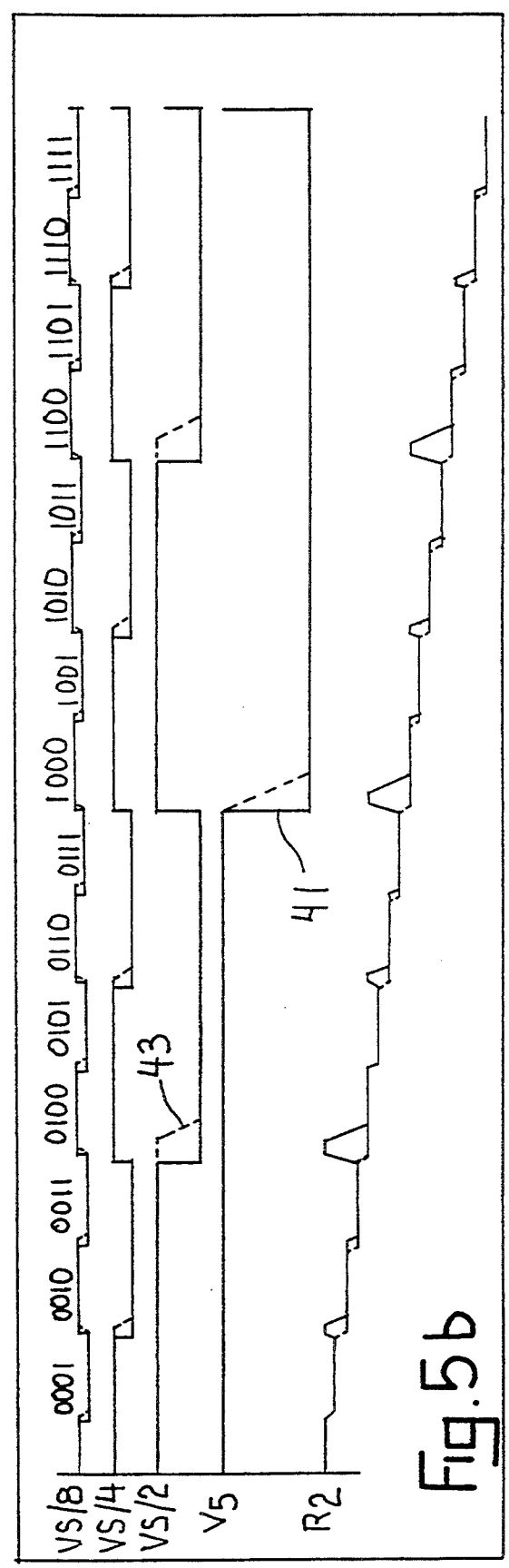

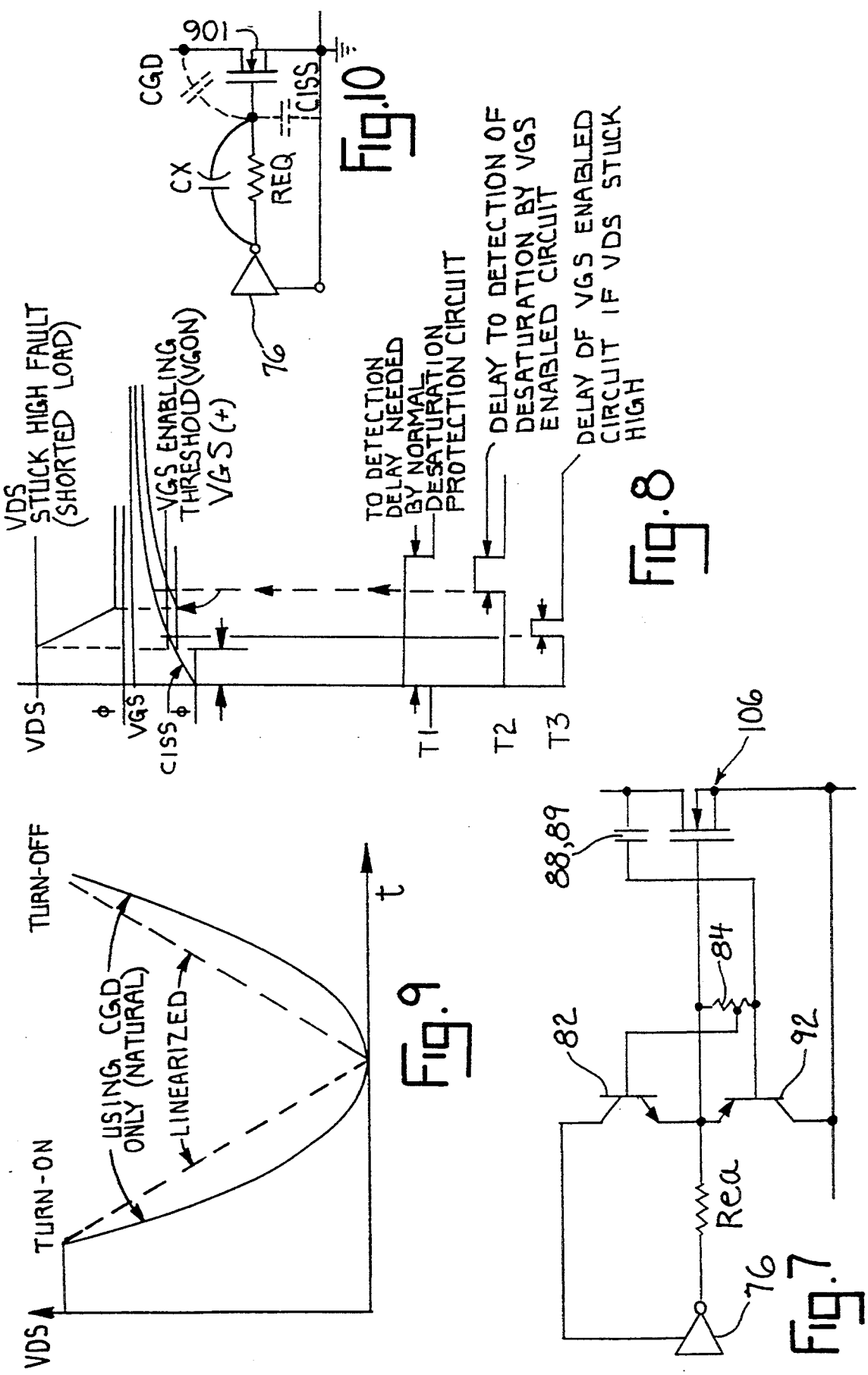

SLEW RATE CONTROL IN A MULTI-LEVEL SWITCH

This is a continuation of copending application(s) Ser. No. 07/923,505 filed on Aug. 3, 1992 now abandoned.

BACKGROUND OF THE INVENTION

This invention is related to managing the changes in voltage which occur during the changing of state of a multilevel power supply controller. In a multilevel power supply controller used to provide the required voltage for efficient amplifier operation, as illustrated in U.S. Pat. No. 5,045,990, the combination of voltage sources supplying the amplifier must be switched to a different combination or state upon changes in the output voltage of the amplifier. Upon changing states to supply more or less voltage, the change in voltage is nearly instantaneous so as to create a large slew rate. The slew rate of the supply is defined as the change in voltage over time (dV/dt).

When the slew rate of the voltage supply increases in value, it must equal or exceed the amplifier slew rate if the operating voltage is to avoid momentary depletion with the amplifier output slew rate (dVo/dt) being momentarily reduced. Further, the slew rates of the resulting output power supplies cannot greatly exceed the amplifier output slew rate since such a result can overload the internal circuitry of the amplifier. This results in switching noise (glitching) occurring in the output signal of the amplifier. Also, instantaneous switching is not permissible since the resulting RFI and switch stress to the MOSFETs are excessive. Moreover, the descending slew rate of the supply must not result in momentary outputs which are less than the final amplifier state value because this would result in momentary overload in the amplifier.

Hence, it is desirable to provide a form of slew control to correct these problems. One such solution which is ideally glitchless is to fix the slew magnitude for all incrementally changing segments each segment representing the voltage level of a voltage source associated with a bit of the binary word described in the sixteen level. This solution simply makes the slew rates of the small voltage segments the same and equal in magnitude to the amplifier slew rate and a ratio of the slew rates of all larger segments equal by ratio to the magnitude of voltages of the larger segments relative to the least segment. In other words, if a segment is twice the voltage of the least segment, its slew rates are twice the slew rates of the least segment. This results in all slew rates starting and terminating at the same time and there being only one possible resultant rate, that being the desired amplifier slew rate.

There are two problems with this method. The first is that the larger segment voltage of a sixteen level controller is eight times the voltage of the least and would have eight times the slew rate. If these slew rates are not perfectly timed and aligned the resultant output of the amplifier would be overloaded by excessive change in voltage supplied to the amplifier over time (dVcc/dt). Second, very large values of slew rate (dVcc/dt) may radiate and interfere with other systems. Thirdly, not all descending codes will be decreasing by one state resulting in the amplifier overloading with excessive −dVcc/dt.

SUMMARY OF THE INVENTION

This invention eliminates these problems by employing circuitry that makes the magnitudes of all segment slew rates equal in amplitude to the amplifier slew rate. All but the largest segment has a delay in its descending slew rate which is delayed so that the segment does not overlap with the turn off of any lesser segment, when they are disabled at the same time. This solution has the least segment delay in its turn off for the length of time that it takes a larger segment to slew the least segment voltage (one incremental voltage) after which time the least segment may be turned off, slewing at one unit of slewing negative. As soon as the least segment has completed its turn off, the next larger segment may begin its turn-off slewing at one unit of slewing negative. When this segment finishes, the next to most significant segment may begin its turn off in like manner.

It is an object of this invention to provide a slew rate controller for a multi-level power supply that supplies sufficient operating voltage to the amplifier output.

It is another object of this invention to prohibit instantaneous switching that would result in excess RFI and switch stress to the MOSFET switches.

Other objects will become apparent upon a reading of the following description.

BRIEF DESCRIPTION OF THE DRAWINGS

FIG. 3 is a partial view of FIG. 2 showing the protection circuit removed for illustrative purposes.

FIG. 4 is a circuit diagram of the protection circuit of the slew rate controller for the least significant segment that was removed from FIG. 3.

FIG. 5a is a timing diagram showing the slew rates of each ascending count.

FIG. 5b is a timing diagram showing the slew rates of each descending count. The dashed lines on FIGS. 5a and 5b represent the segment voltages and slew rates when the circuitry of this invention is applied. On FIG. 5b, the net Vcc curve R2 uses dashed lines for the ideal curve.

FIG. 7 is a circuit diagram of the slew rate control circuit of the timing diagram of FIG. 2.

FIG. 8 shows a timing diagram for the protection circuit.

FIG. 9 is a graph of Vds, versus time.

FIG. 10 is an equivalent circuit of FIG. 7.

DESCRIPTION OF THE PREFERRED EMBODIMENT

The preferred embodiment herein described is not intended to be exhaustive or to limit the invention to the precise forms disclosed. It is chosen and described to explain the principles of the invention and its application and practical use so that others skilled in the art may follow its teachings.

Figure 1:
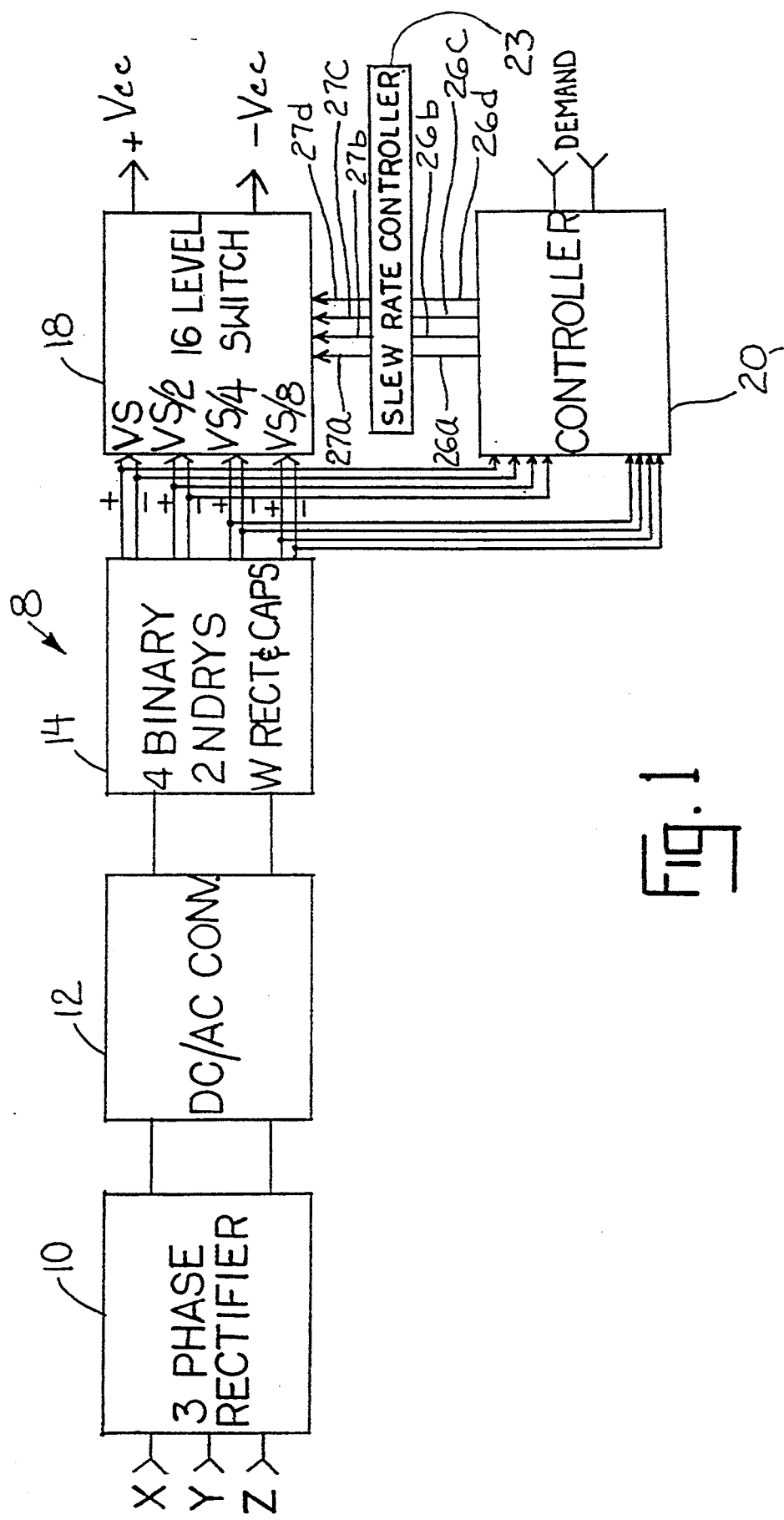
FIG. 1 is a block diagram of the circuitry applied to a sixteen level controller.

Referring to the drawings, FIG. 1 illustrates in block diagram form the slew controller of this invention as associated with the sixteen level controller (U.S. Pat. No. 5,045,940 incorporated herein by reference). Three-phased voltage supply lines designated X, Y, Z are connected to the input of three phase rectifier 10. The DC output voltage of rectifier 10 is connected to a DC to AC converter 12. The output converter 12 is connected to a transformer circuit 14 having four secondary windings. The four secondary windings of the transformer circuit 14 are connected to separate rectifiers and filter capacitors (not shown) as is common.

The rectified-filtered outputs of the secondary outputs of the secondary windings constitute the unregulated voltage sources Vs, Vs/2, Vs/4 and Vs/8 which are controlled by the sixteen level switch 18 and controller 20. The slew rate controller 23 of this invention is connected to the sixteen level switch control. The secondary winding outputs of voltage sources are connected to the sixteen level switch Switch 18 includes positive Vcc and negative Vcc power outputs for connection to a load, i.e. a power amplifier (not shown), The amplifier is connected in a bridged configuration as stated in the sixteen level controller (see U.S. Pat. No. 5,045,990 incorporated herein by reference).

Figure 2:
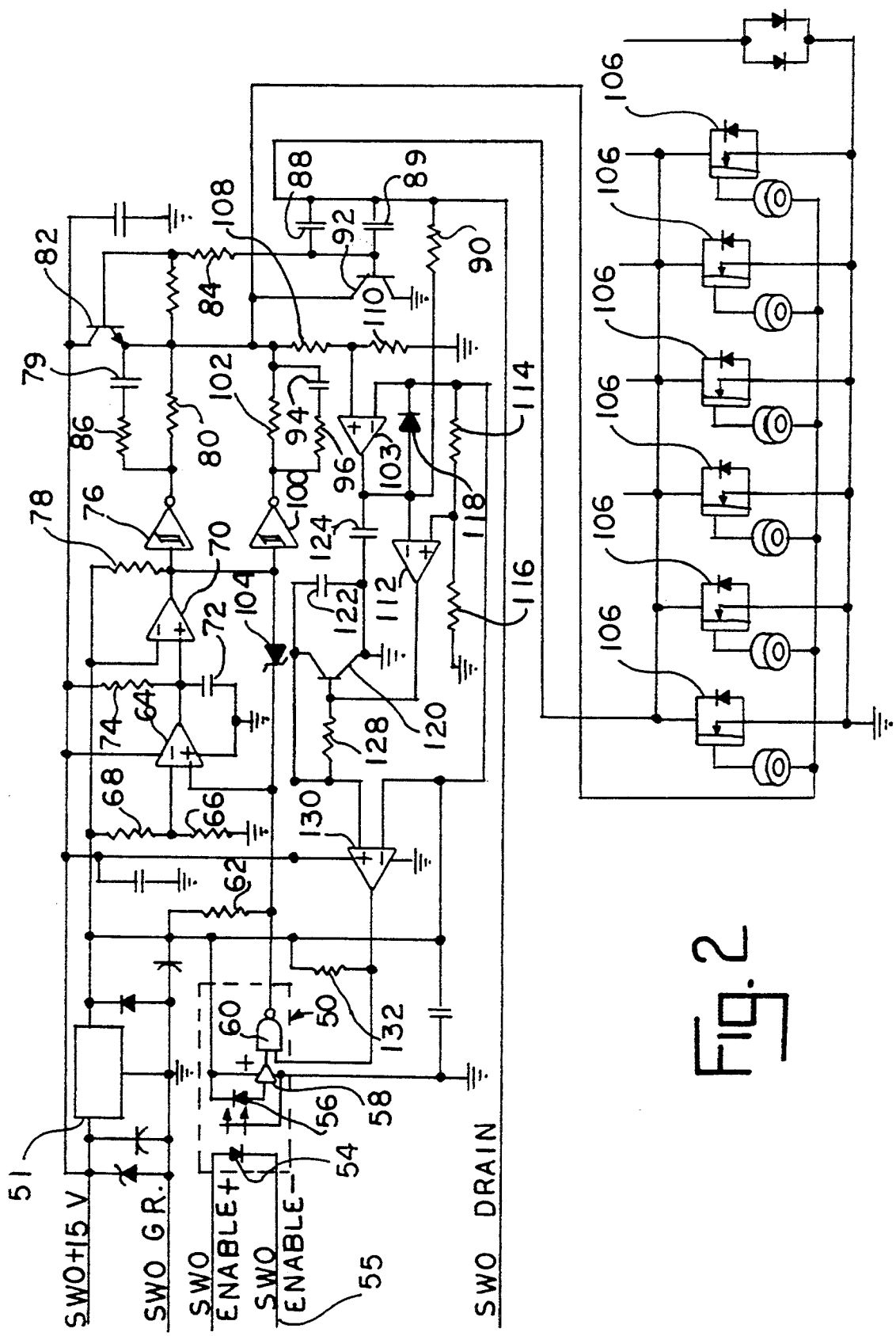
FIG. 2 is a circuit diagram of the least significant segment of the complete circuit applied to the switches which are MOSFETs.

Controller 20 is provided for monitoring a demand signal and voltage source levels arid drives the sixteen level switch 18 accordingly, Controller 20 is connected to switch 18 by switch enable lines 26. The slew rate controller is connected to the switch enable lines 26a, b, c, d and 27a, b, c, d between the sixteen level switch 18 and controller 20. The switch enable lines 26a, b, c, d and 27a, b, c, d are respectively associated with switches SWO, SW1, SW2, and SW3. Voltage source Vs is associated with SW3 and the circuitry similarly as shown in FIG. 2 is connected between switch enable lines 26d and 27d. Voltage source Vs/2 is associated with SW2 and the circuitry similarly as shown in FIG. 2 is connected between switch enable lines 26c and 27c. Voltage source Vs/4 is associated with SW1 and the circuitry similarly as shown in FIG. 2 is connected between switch enable lines 26b and 27b. Voltage source Vs/8 is associated with SWO and the circuitry as shown in FIG. 2 is connected between switch enable lines 26a and 27a.

Figure 6:
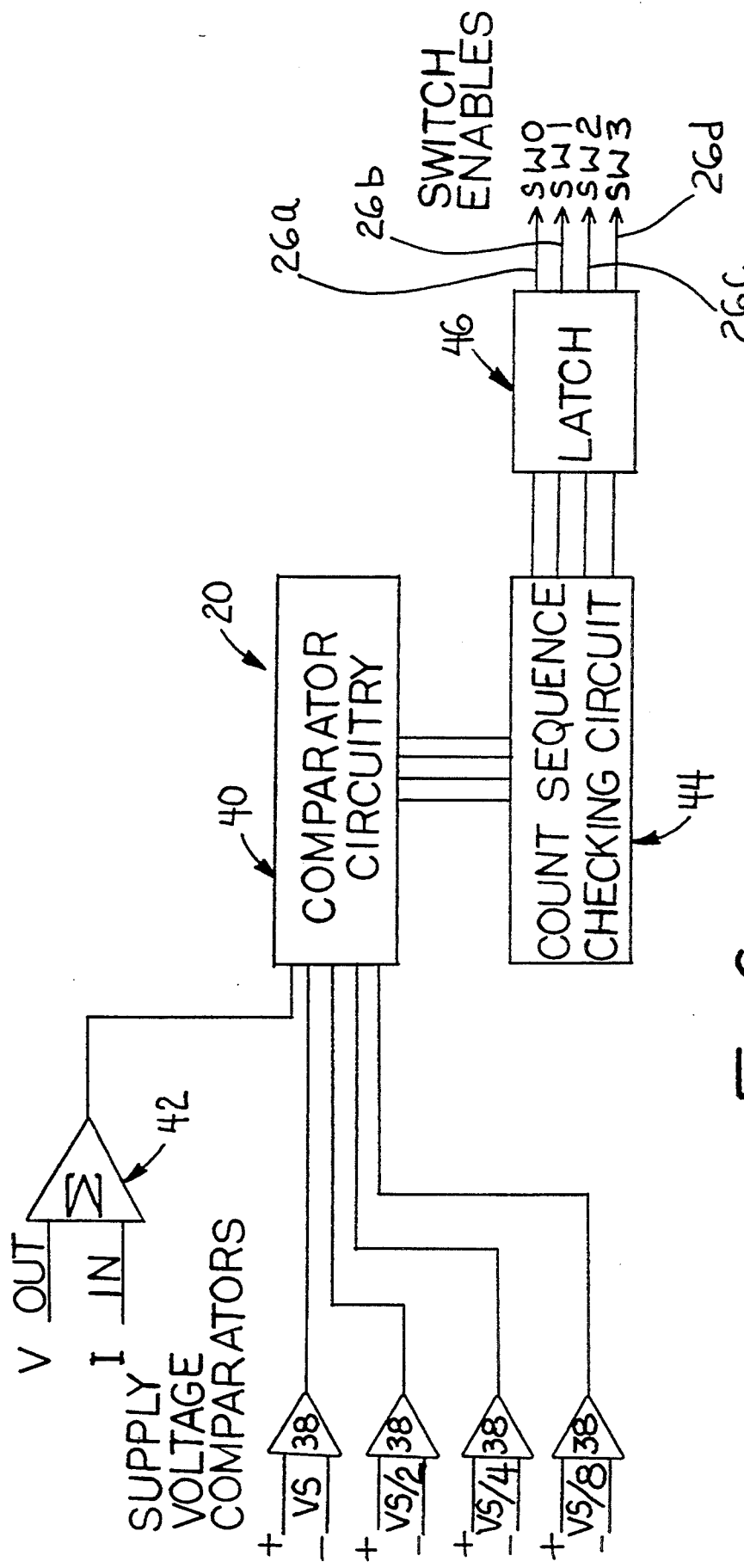
FIG. 6 is a schematic diagram of the sixteen level controller of this invention.

FIG. 6 illustrates sixteen level 20 controller of which The present invention is connected to the switch enable lines 26a, b, c and d. Sixteen level controller 20 includes voltage supply monitors 38 and a summing circuit 42 connected to the input of a comparator circuit 40. The output from the summing circuit represents the amplifier voltage demand signal and the voltage supply monitors 38 represent the voltages available from each of the voltage sources. The comparator circuit 40 converts the demand and available voltage signals into a four bit binary control word. The binary control word is passed from the comparator circuit to a sequence checking circuit 44 to ensure proper binary sequence on the ascending count. The control word is passed from the sequence checking circuit to a latch circuit 46 which delays the passing control word to the voltage supply switches on countdown. A more thorough explanation of the operation of the sixteen level controller and definitions of the elements may be had by reference to U.S. Pat. No. 5,045,990.

FIG. 5a shows the slew rate for the ascending count. The straight lines 41 indicate that instantaneous switching by controller 20 is occurring between these binary states. The dashed lines 43 indicate the slew rate as a result of the application of the circuitry of this invention. This graph depicts four slew rates for each of the voltage sources (Vs, Vs/2, Vs/4, Vs/8), plus the resultant slew rate ($R_1$) which is the sum of the slew rates of the four voltage sources. Graph 5b shows the slew rates of the four voltages sources on descending count and also the resultant sum ($R_2$) thereof. Each voltage source employs the same timing circuit to control the slew rates with the exception of the Vs voltage source since the required (zero) delay naturally occurs upon switching. As these timing circuits have essentially the same components but with different values, only the circuit for Vs/8 will be described in detail.

FIG. 3 depicts a timing circuit for the least significant segment Vs/8 which is switched on and off most often. A 15 v supply line 51 is connected to each gate drivers 76, 100 and comparators 64, 70 of this circuitry. A logic optic isolator 50 is connected to switch enable line 10. The logic isolator 50 is composed of a high speed infrared LED 54 illuminating a photo diode 56, an amplifier 58 and a NAND gate 60. The amplifier 58 is connected between the anode of diode 56 and an NAND gate 60 with the output of amplifier 58 being connected to the input of the NAND gate. The output of the NAND gate is coupled with pull-up resistor 62 and also connected to the non-inverting input of comparator 64. The junction of resistors 66 and 68 are connected to the inverting input of comparator 64 with resistor 66 being grounded and resistor 68 being connected to the 5 volt reference voltage.

The output of the comparator 64 is then used as the non-inverting input of another comparator 70°. A capacitor 72 is connected between ground and the non-inverting input of the comparator 70. A resistor 74 is connected between the non-inverting input of comparator 70 and the 15 volt supply line. The inverting input of comparator 70 is connected to the 5 volt reference voltage. The output of comparator 70 is connected to the input of gate driver 76. The input of the inverter or gate driver 76 is driven through pull-up resistor 78. The output of the logic isolator 50 or coupler is also connected to the cathode of a Schotkey diode 104 of which the anode of that diode is connected to the input of the gate driver 76 and gate driver 100 and pull-up resistor 78.

The output of the gate driver 76 is then connected to a switching slew rate control circuit. This circuit regulates the MOSFETs' gate to drain capacitor charging and controls the switching on/off slewing rates. A resistor 86 is connected in series between the capacitor 79 and output of the gate driver 76. Capacitor 79 (Cx) is connected to the emitter of the NPN transistor 82. Another resistor 80 is connected between the emitter of the transistor 82 and output of the gate driver 76. The collector lead of the transistor 82 is connected to the 15 volt supply line 51. The base of the transistor 82 is connected through a resistor 84 to capacitors 88 and 89.

This circuitry operates when the switch (MOSFETs) turn off. The circuitry for when the switch turns on utilizes a PNP transistor 92 with the base lead also connected to the capacitors 88 and 89 and with collector terminal of transistor 92 being grounded. The emitter leads of each of the transistors 82, 92 are connected to the gates of the MOSFET transistors 106 used as the switch (SWO). The emitter lead of transistor 92 is also connected to capacitor 94 which is in series combination with a resistor 96 in parallel with another resistor 102. The output of gate driver 100 is connected to this RC circuit. The source and drain leads of the MOSFETs compromise the segment switch (in this case SW0) to enable an output segment as required in a 16-level supply.

Protection Circuit

The protection circuit as shown in FIG. 4 for each of the switches 106 is used to determine when there is too much rotatable drop across the MOSFETs and which would damage the MOSFET. FIG. 2 illustrates how the protection circuit is connected to the MOSFETs 106. Each protection circuit includes comparator 112 used to monitor the Vds (drain to source voltage) of the MOSFET 106. Resistors 108 and 110 are connected in series and used as a voltage divider of the MOSFET's gate potential (Vgs) with their junction being connected to the non-inverting input of the comparator 103. A reference voltage of 5 v is established at the inverting input of comparator 103. Resistors 108 and 110 ape chosen such that their divider ratio equals 5 v/Vgon, where Vgon is equivalent to a Vgs potential selected to represent a fully on9 MOSFET. The output of the comparator 103 is connected to the inverting input of comparator 112.

When the MOSFET gate potential is at or above Vgon comparator 103 will allow charging of capacitor 124 with the MOSFET's drain voltage supplied through resistor 90. The timing delay of capacitor 124 and resistor 90 allow for very brief transients of high switch dissipation. The reference MOSFET drain-source fault voltage is reduced to 2 volts by resistors 114 and 116 used as voltage dividers and supplied to the non-inverting input of comparator 112. Clamp diode 118 is connected between the 5 v reference and the inverting input of comparator 112 with the anode of the diode 118 connected to the inverting input of comparator 112 and output of comparator 103. The output of the comparator 112 is connected to the base lead of a PNP transistor 120.

The PNP transistor 120 and capacitor 122 connected to it constitute a timing circuit within the protection circuit to inhibit immediate re-enabling of the MOSFETs before the heat of a fault could dissipate. Capacitor 122 is connected across the emitter and collector of transistor 120. A 15 v supply line is connected through resistor 126 to the emitter of the transistor 120. The output of comparator 112 is also connected through resistor 128 to the non-inverting input of comparator 130. The inverting input of comparator 130 is connected to a 5 v reference voltage. The output of the comparator 130 is resistively coupled by resistor 132 to the input of the NAND gate of the logic isolator or coupler 50.

In operation, when VDS is continually greater than 2 v indicating a large dissipation which could damage the MOSFETs, the output of the comparator 112 goes low turning on the PNP transistor 120. When transistor 120 turns on, capacitor 122 discharges. This discharged voltage is inputted to comparator 130 which acts then to disenable the NAND gate 60 of logic isolator 50. When isolator 50 disenables, the gate driver 100 turns off causing the switch 106 to open removing dissipation from the MOSFETs.

When the gate driver turns the MOSFETs on or off, there will be a propagation delay when the slewing of VDS regulates the MOSFET's Vgs at a potential low enough (such as Vgon) to cause comparator 103 to discharge capacitor 124. When the MOSFETs are being turned on, the overdissipation detector essentially waits until Vgs is of a full MOSFET enabling potential (Vgon) and then has very quick reaction timing being driven from excessive Vds. When VDS increases, the detection is faster. This protection circuit is more responsive to fault conditions as it automatically disregards normal slewing intervals wherein Vgs is just above threshold but not yet at full on potential (Vgon).

FIG. 8 shows the timing diagram of the prior and present protection circuit of the slew rate controller. $T_1$ represents the delay needed to prevent false detection with the traditional protection circuit. $T_2$ represents the much reduced delay needed by the above described protection circuit for normal desaturation protection. $T_3$ shows the greatly reduced delay should the MOSFET be working with a shortened load.

General Operation

The slew rate controller operates as follows with reference to FIG. 2 that shows the complete circuit. When the switch 55 is enabled, a high is inputted to the NAND gate of the isolator which produces a low at its output. This low is then inputted to the non-inverting input of the comparator 64 for comparison with the reduced reference voltage from resistors 66 and 68. The (open collector output) comparator 64 outputs a low or logic 0 which discharges capacitor 72 setting the timing delay circuit. Schotkey diode 104 bypasses the timer so that a switch enabling signal passes immediately on to the gate driver 76.

When the voltage of the capacitor 72 is less than 5 volts, the output of comparator 70 goes low. Thus, the capacitor 72 and the resistor 74 function as a timing delay circuit to keep the MOSFETs on delaying the switch-off event. The horizontal dash line shown in FIG. 5a and 5b indicates this delay. The delay is proportional to its respective voltage source. The delays for the voltage sources are scaled by powers of two, except for the largest voltage source.

The eventual output high from the comparator 70 is inputted to the gate drivers 76 and 100 of the circuit that controls the slewing Pate. The output of gate drivers 76 and rate goes low actuating the circuitry that controls the slewing rate when the MOSFET is turning off. Essentially, the internal non-linear gate to drain capacitance of the MOSFET is charged and the rate control circuit is used to linearize the slew rate. Without this rate control circuitry the slew rate would be non-linear, similar to a graph of the change in voltage over time of the non-linear Cgd capacitor when charging and discharging at constant current. This is not desirable since the slew rate is still too fast during the beginning of the change in voltage and too low at the end.

FIG. 7 shows an enlarged picture of the rate control circuitry upon activating. When the output of the gate drivers 76 and 100 goes high, the capacitors (Cx) 79 and 94 begin to charge. Capacitors (Cx) 79 and 94 are sized such that when the gate potential of the MOSFETs is just at turn on, the charge stored in Cx is equal to the charge stored in the MOSFET gates. FIG. 10 shows an equivalent circuit of the rate control circuitry for better illustration. Ciss represents the internal gate to source capacitance of the MOSFETs 106. Rea is the equivalent resistance of resistors 80 and 102.

When the MOSFETs begin to turn on, the discharge current in capacitors 88 and 89 turn on PNP transistor 92 and the gate current from the driver is shunted to ground such that the dVds/dt across switch 106 is constant instead of being a non-linear function of Vds (Cgd) as shown in FIG. 9 and thus making switch slewing linear as shown in FIG. 5a and 5b. The graph in FIG. 9 shows the voltage Vds which is the opposite of the gate to source voltage shown in FIG. 5a and 5b. Essentially, the PNP transistor 92 shunts the gate current across the gate source of the MOSFET when the slewing is too fast and allows the available gate driven current to be outputted to the MOSFET gates when the slew rate is too low.

When the switches are turning off, one can tolerate more delays, thus tolerating the stored charge on Cx being smaller than optimum for this mode. The turn-off gate drive produces a charging of capacitors 88 and 89 that activates the NPN transistor 82 circuitry which linearizes the slew rate similar to the PNP transistor 92 circuitry operating when the switch is turned on.

It is understood that the above description does not limit the invention to the given details, but may be modified within the scope of the following claims.

I claim:

1. A device for regulating voltage outputted from a plurality of varying voltage sources supplying said voltage to input of said amplifier comprising:
 a plurality of switching means, each switching means having an output, a said switching means for operative association with each of said voltage sources, each switching means for switching its said associated voltage source on and off;
 a plurality of control means, a said control means operatively associated with each of said switching means, each control means connected to a said switching means and adapted for connection to the said voltage source associated with said switching means, each control means for decreasing magnitude of the change in voltage outputted from said connected voltage source over time when the voltage source is being switched on or off, said outputs from said switching means being summed for supplying voltage to said amplifier, at least some of said plurality of control means for delaying turn off of their respective said associated voltage sources in proportion to the voltage sources size.

2. The device of claim 1 wherein said voltage sources are scaled in voltage outputted by powers of two.

3. The device of claim 1 wherein each control means includes a timing means for delaying switching off of said voltage source associated with a said control means for a predetermined period.

4. The device of claim 1 wherein said sum of said plurality of control means includes all of said control means with the exception of the control means associated with the largest of said associated voltage sources.

5. A device for regulating voltage outputted from a plurality of voltage sources supplying said voltage to input of said amplifier comprising:
 a plurality of switching means, each switching means having an output, a said switching means for operative association with each of said voltage sources, each switching means for switching its said associated voltage source on and off;
 a plurality of control means, a said control means operatively associated with each of said switching means, each control means connected to a said switching means and adapted for connection to the said voltage source associated with said switching means, each control means for decreasing magnitude of the change in voltage outputted from said connected voltage source over time when the voltage source is being switched on or off, said outputs from said switching means being summed for supplying voltage to said amplifier;
 each control means including a sensing means for detecting a switch enable signal from a switch enable line and activating a said switching means upon detecting said switch enable signal, said sensing means having an input and an output, said input of said sensing means being connected to said switch enable line; each sensing means for deactivating a said switching means when said switch enable signal is not detected; each control means including a drive means having an input and an output, said input of said drive means connected to the output of a said sensing means, said drive means being responsive to a said sensing means for activating a said switching means upon said sensing means detecting said switch enable signal; said drive means being responsive to said sensing means for deactivating a said switching means when said sensing means does not detect said switch enable signal; each control means including a timing means connected between the output of said sensing means and said input of said drive means for delaying switching off of said voltage source associated with a said control means for a predetermined period.

6. The device of claim 5 wherein said predetermined period of said timing means is proportional to said outputted voltage from said voltage source being switched off.

7. The device of claim 6 wherein said predetermined periods from each timing means associated with said voltage sources are scaled by powers of two except for said voltage source outputting largest voltage.

8. The device of claim 5 wherein each control means includes a current regulating means connected to said output of said drive means for controlling the change in voltage outputted from said voltage source over time when said voltage source is being switched on such that said change in voltage over time is constant.

9. A device for regulating voltage outputted from a plurality of voltage sources supplying said voltage to input of said amplifier comprising:
 a plurality of switching means, each switching means having an output, a said switching means for operative association with each of said voltage sources, each switching means for switching its said associated voltage source on and off;
 a plurality of control means, a said control means operatively associated with each of said switching means, each control means connected to a said switching means and adapted for connection to the said voltage source associated with said switching means, each control means for decreasing magnitude of the change in voltage outputted from said connected voltage source over time when the voltage source is being switched on or off, said outputs from said switching means being summed for supplying voltage to said amplifier;
 a plurality of suppressing means, a said suppressing means operatively associated with each switching means for preventing a voltage drop greater than a predetermined value across a said switching means, a said suppressing means being responsive to a said switching means when said voltage source associated with a said switching means is switched on; each suppressing means including a sensing means having an input and an output, said input of said sensing means connected to a said switching means for detecting a predetermined voltage drop across a said switching means, said output of a said sensing means being operatively associated with a switch enable line to deactivate said switch enable line when a said sensing means detects a predetermined voltage; each sensing means including a delay means for inhibiting said detection of said predetermined voltage drop for a predetermined time until said voltage sources being switched on are finished switching on.

10. The device of claim 9 wherein each suppressing means includes a drive means, said drive means connected to said output of said sensing means, said output of said drive means operatively associated with said switch enable line, said drive means being responsive to said sensing means for deactivating said switch enable line.

11. The device of claim 10 wherein each suppressing means includes a second delay means connected between said output of said sensing means and input: of said drive means, said second delay means for prolonging deactivation of said switch enable line for a predetermined period upon said sensing means no longer detecting said predetermined voltage drop across said one switching means.

* * * * *